United States Patent
Hua et al.

(10) Patent No.: US 11,403,906 B2
(45) Date of Patent: Aug. 2, 2022

(54) ACTUATOR WITH LOCKING MECHANISM

(71) Applicant: Fasteners for Retail, Inc., Twinsburg, OH (US)

(72) Inventors: Yun Hua, Broadview Heights, OH (US); Michael Eric Liedtke, Kent, OH (US)

(73) Assignee: Fasteners for Retail, Inc., Twinsburg, OH (US)

( * ) Notice: Subject to any disclaimer, the term of this patent is extended or adjusted under 35 U.S.C. 154(b) by 74 days.

(21) Appl. No.: 16/743,687

(22) Filed: Jan. 15, 2020

(65) Prior Publication Data
US 2021/0217264 A1    Jul. 15, 2021

(51) Int. Cl.
*G07F 5/26*    (2006.01)
*F16D 11/16*   (2006.01)
*F16H 21/44*   (2006.01)

(52) U.S. Cl.
CPC ............... *G07F 5/26* (2013.01); *F16D 11/16* (2013.01); *F16H 21/44* (2013.01)

(58) Field of Classification Search
CPC ........ A47F 5/0861; A47F 1/128; F16D 11/16; F16H 21/44; F16H 27/08
USPC ...................... 221/1, 15, 312 A, 75; 700/232
See application file for complete search history.

(56) References Cited

U.S. PATENT DOCUMENTS

| | | | | |
|---|---|---|---|---|
| 3,294,281 A * | 12/1966 | Schlaf | ........ | G07F 9/002 221/9 |
| 5,186,355 A * | 2/1993 | VonDelinde | ........ | G07F 11/42 221/277 |
| 6,027,148 A * | 2/2000 | Shoemaker | ........ | E05B 47/0002 292/201 |
| 7,533,784 B2 * | 5/2009 | Vlastakis | ........ | A47F 5/0861 221/151 |
| 7,559,437 B2 * | 7/2009 | Colelli | ........ | G07F 11/24 221/312 A |
| 7,692,522 B2 * | 4/2010 | Hartinger | ........ | H01H 1/0015 335/131 |
| 7,798,303 B1 * | 9/2010 | Chang | ........ | G07D 1/08 194/293 |

(Continued)

FOREIGN PATENT DOCUMENTS

CA    2463394 A1    4/2005
DE    102007053886 A1 *    5/2009    ............ A47F 1/128

(Continued)

OTHER PUBLICATIONS

AU Examination Report Application No. AU 2020281152 dated Jul. 7, 2021.

(Continued)

*Primary Examiner* — Rakesh Kumar
(74) *Attorney, Agent, or Firm* — Honigman LLP

(57) ABSTRACT

A product-dispensing device comprises a rod, a product-dispensing coil, an actuator, a locking gear, and a button. The rod is configured to support a product. The product-dispensing coil is disposed about the rod. The actuator is operably coupled to the product-dispensing coil for rotation about a first axis. The locking gear is rotatable between a first position and a second position and includes a locking arm configured to inhibit rotation of the actuator in the second position. The button is operably coupled to the locking gear and configured to rotate the locking gear between the first position and the second position.

15 Claims, 7 Drawing Sheets

(56) References Cited

U.S. PATENT DOCUMENTS

| | | | | |
|---|---|---|---|---|
| 8,523,012 B2* | 9/2013 | Richardson | | A47F 5/0861 221/251 |
| 8,534,469 B2* | 9/2013 | Northrup, Jr. | | A47F 5/0861 211/59.1 |
| 8,629,772 B2* | 1/2014 | Valiulis | | A47F 5/0823 340/568.8 |
| 8,684,227 B2* | 4/2014 | Richardson | | A47F 5/0823 221/251 |
| 9,078,532 B1* | 7/2015 | McHatet | | E05B 73/00 |
| 9,318,007 B2* | 4/2016 | Valiulis | | A47F 5/0823 |
| 9,318,008 B2* | 4/2016 | Valiulis | | G08B 13/149 |
| 9,675,184 B2* | 6/2017 | Xin | | A47F 5/0006 |
| 10,111,540 B2 | 10/2018 | Brej | | |
| 10,219,636 B2* | 3/2019 | Berglund | | A47F 1/125 |
| 10,260,793 B2* | 4/2019 | Saito | | F16K 31/53 |
| 2007/0283615 A1* | 12/2007 | Vlastakis | | A47F 5/0861 43/55 |
| 2009/0145918 A1* | 6/2009 | Colelli | | G07G 3/003 221/3 |
| 2009/0184129 A1* | 7/2009 | Vlastakis | | A47F 5/0861 221/15 |
| 2011/0036789 A1* | 2/2011 | Richardson | | A47F 5/0861 211/1.57 |
| 2011/0127225 A1* | 6/2011 | Hooks, Jr. | | A47F 5/0823 211/1.57 |
| 2012/0253508 A1* | 10/2012 | Holmes | | A47F 5/0861 700/232 |
| 2014/0167962 A1* | 6/2014 | Valiulis | | G07F 9/026 211/59.3 |
| 2014/0352372 A1* | 12/2014 | Grant | | A47F 5/0861 70/57.1 |
| 2016/0227942 A1* | 8/2016 | Xin | | F16H 1/20 |
| 2017/0238724 A1* | 8/2017 | Berglund | | A47F 5/0823 |
| 2017/0248211 A1* | 8/2017 | Chino | | F16H 1/206 |
| 2017/0265653 A1* | 9/2017 | Brej | | A47F 1/128 |
| 2021/0217264 A1* | 7/2021 | Hua | | F16H 21/44 |

FOREIGN PATENT DOCUMENTS

| | | | | |
|---|---|---|---|---|
| GB | 1306500 A | 2/1973 | | |
| WO | WO-0132061 A2 * | 5/2001 | | A47F 5/0861 |
| WO | 2006123220 A1 | 11/2006 | | |
| WO | WO-2006123220 A1 * | 11/2006 | | E05B 15/101 |
| WO | WO-2013086084 A1 * | 6/2013 | | A47F 5/0823 |

OTHER PUBLICATIONS

Extended European Search Report Application No. EP 20217173.2 dated Jun. 9, 2021.

* cited by examiner

ACTUATOR WITH LOCKING MECHANISM

FIELD

The present disclosure relates generally to a device for dispensing products. More specifically, the disclosure relates to a dispensing device which incorporates a theft deterrent device having a locking subassembly.

BACKGROUND

This section provides background information related to the present disclosure and is not necessarily prior art.

Peg hooks or display hooks are commonly used in retail stores for displaying merchandise. Several identical items can be hung on a single hook to display such items for sale. This display method has several advantages, including allowing continuous viewing of the item. When the front item is removed from the hook, the next item becomes visible. Such hook displays are advantageous because they can be adapted to various display configurations as the hooks can be moved around by the merchant on a supporting peg board wall as desired. One disadvantage of such hooks however is that they allow thieves to easily take as many items from the hooks as they wish in a very short period of time. The taking of many or all of the in-stock items of a particular product by thieves (commonly referred to as "sweeping") is a major problem in the retail industry.

It is known to provide a support rod of a merchandise display hook which supports high risk merchandise with a series of S bends adjacent the free end of the support to prevent a shoplifter from easily "sweeping" all of the items off the display hook. Further, it is known to provide the display hook with a locking device configured to be positioned on the support rod between the free end of the rod and the forwardmost item of merchandise. An anti-sweep locking device often requires a special key and assistance from sales personnel in order to allow a purchaser to take an item supported on the hook. S bends adjacent the free end of the display hook can make it difficult for potential customers to remove items from the display hook and may dissuade potential customers from removing products held on such hooks. A mechanical time delay mechanism adjacent the free end of the support rod can increase the time required to dispense each item of merchandise from the display hook.

SUMMARY

This section provides a general summary of the disclosure, and is not a comprehensive disclosure of its full scope or all of its features.

In one exemplary aspect of the disclosure, a product-dispensing device comprises a rod, a product-dispensing coil, an actuator, a locking gear, and a button. The rod is configured to support a product. The product-dispensing coil is disposed about the rod. The actuator is operably coupled to the product-dispensing coil for rotation about a first axis. The locking gear is rotatable between a first position and a second position and includes a locking arm configured to inhibit rotation of the actuator in the second position. The button is operably coupled to the locking gear and configured to rotate the locking gear between the first position and the second position.

Implementations of this aspect may include one or more of the following features. In some implementations, the actuator includes an outer knob rotatable in a first direction about the first axis and a second direction opposite the first direction about the first axis. When the outer knob is rotated in the first direction, the product-dispensing coil may be configured to rotate and cause the product to move closer to a free end of the rod. The outer knob may include a plurality of teeth on an outer peripheral surface and the locking arm may be configured to selectively engage the plurality of teeth of the outer knob to inhibit rotation of the outer knob in the second direction about the first axis.

The product-dispensing device may include a biasing gear coupled to the locking gear and configured to bias the locking gear toward the second position.

The product-dispensing device may include a biasing spring coupled to the biasing gear. The biasing gear may be rotatable between a third position where the locking gear is in the first position and a fourth position where the locking gear is in the second position. The biasing spring may be configured to bias the biasing gear toward the fourth position.

The product-dispensing device may include a central gear operably coupled to the outer knob and configured to rotate with the outer knob in the first direction about the first axis. The central gear may be configured to rotate the biasing gear between the third position and the fourth position. When the locking gear is in the first position and the biasing gear is in the third position, upon rotation of the central gear in the first direction about the first axis, the central gear may cause the biasing gear to rotate from the third position to the fourth position.

In another aspect of the disclosure, a product-dispensing device comprises a housing, an actuator, a locking gear, and a button. The actuator is supported by the housing for rotation about a first axis. The locking gear is supported by the housing for rotation between a first position and a second position about a second axis, the locking gear including a locking arm configured to inhibit rotation of the actuator in the second position. The button is supported by the housing for translation between a third position and a fourth position, the button operable to rotate the locking gear between the first position and the second position upon translation between the third position and the fourth position.

Implementations of this aspect may include one or more of the following features. In some implementations, the actuator includes an outer knob rotatable in a first direction about the first axis and a second direction opposite the first direction about the first axis. Rotation of the outer knob in the first direction may be configured to dispense a product.

The outer knob may include a plurality of teeth on an outer peripheral surface and the locking arm may be configured to selectively engage the plurality of teeth of the outer knob to inhibit rotation of the outer knob in the second direction about the first axis.

The product-dispensing device may include a biasing gear coupled to the locking gear and configured to bias the locking gear toward the second position.

The product-dispensing device may include a biasing spring coupled to the biasing gear. The biasing gear may be rotatable between a fifth position where the locking gear is in the first position and a sixth position where the locking gear is in the second position. The biasing spring may be configured to bias the biasing gear toward the sixth position.

The product-dispensing device may include a central gear operably coupled to the outer knob and configured to rotate with the outer knob in the first direction about the first axis. The central gear may be configured to rotate the biasing gear between the fifth position and the sixth position. When the locking gear is in the first position and the biasing gear is in the fifth position, upon rotation of the central gear in the first direction about the first axis, the central gear may cause the biasing gear to rotate from the fifth position to the sixth position. The housing may include a catch configured to retain the button in the third position.

In yet another aspect of the disclosure, a locking mechanism for a product-dispensing device comprises a locking gear, a button, and a biasing gear. The locking gear is rotatable between a first position and a second position and includes a locking arm configured to inhibit rotation of an actuator in the second position. The button is configured to translate between a third position and a fourth position, the button operable to rotate the locking gear between the first position and the second position upon translation between the third position and the fourth position. The biasing gear is coupled to the locking gear and configured to bias the locking gear toward the second position.

Implementations of this aspect may include one or more of the following features. In some implementations, the locking mechanism includes a biasing spring coupled to the biasing gear. The biasing gear may be rotatable between a fifth position where the locking gear is in the first position and a sixth position where the locking gear is in the second position. The biasing spring may be configured to bias the biasing gear toward the fifth position. Translation of the button from the third position to the fourth position may cause the biasing gear to rotate from the fifth position to the sixth position.

The locking mechanism may include a catch configured to retain the button in the third position. Rotation of the biasing gear from the fifth position to the sixth position may cause (i) the locking gear to rotate from the first position to the second position, (ii) the button to disengage from the catch, and (iii) the button to translate from the third position to the fourth position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

Figure 1:
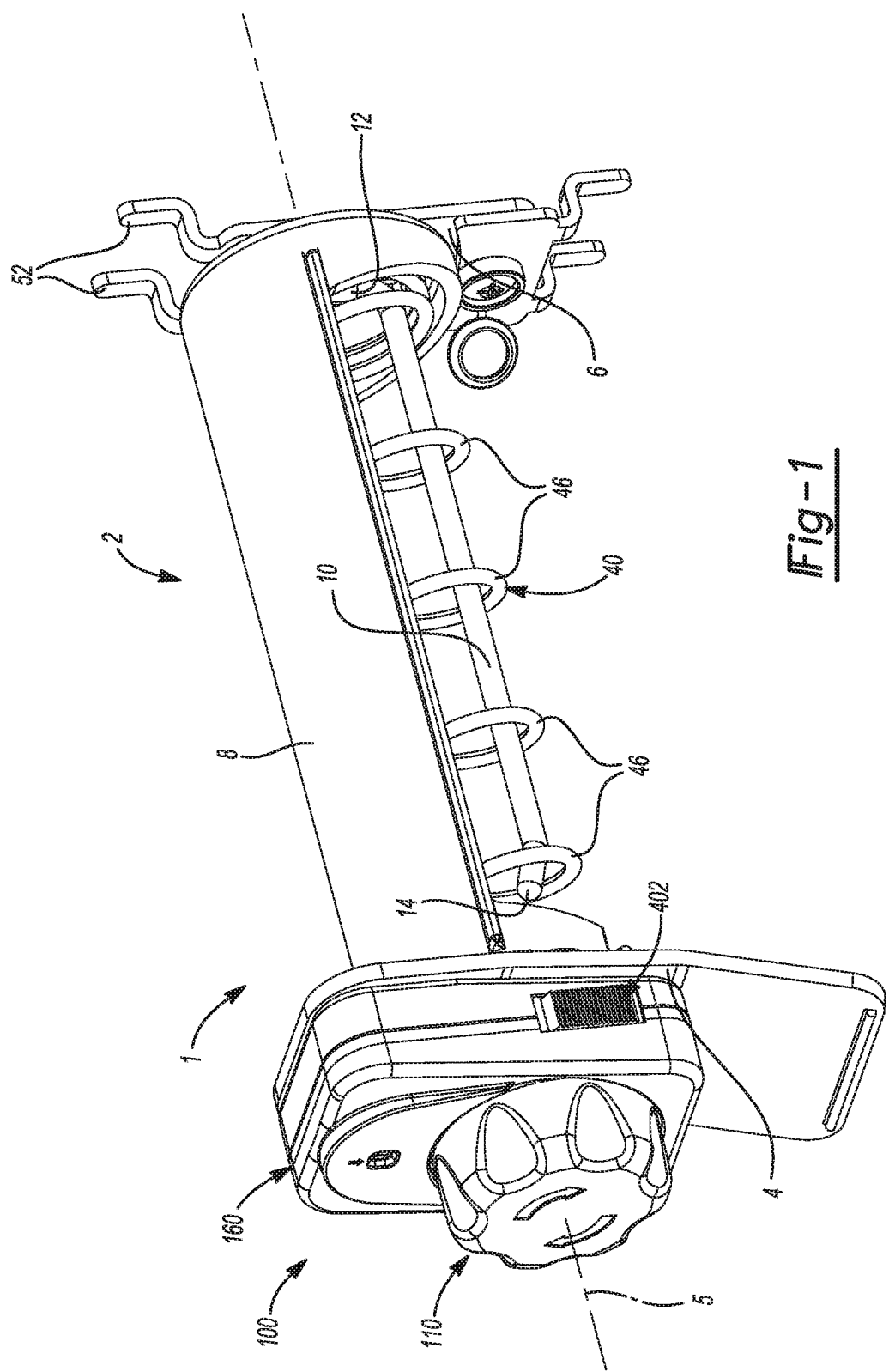
FIG. 1 is a perspective view of an apparatus for dispensing products employing a time delay actuator in accordance with the principles of the present disclosure.

Referring to FIG. 1, a merchandise dispenser 1 with a coil actuation is employed for use in a retail store environment to dispense merchandise. The apparatus comprises a housing or chassis 2 including a front wall 4, a rear wall 6, and a top wall 8. In some implementations, at least some of the wall panels of the housing 2 can be made out of a transparent material, such as a known type of plastic. This allows for easy visibility of merchandise which is supported in the housing. The merchandise may comprise one or more packages. The packages can be located adjacent the front wall 4 of the housing so as to be readily accessible by potential customers. The dispenser 1 includes a support rod 10 around which is disposed a helical coil 40. Both the rod 10 and the coil 40 can be aligned along a common axis 5. The helical coil 40 includes a series of spiraling coil sections 46 extending longitudinally along the axis 5. The housing 2 can be mounted on a peg board or like support device by one or more L-shaped fingers 52.

A distal end 12 of the rod 10 is engaged with the rear panel 6 and is mounted thereto. In some implementations, the distal end 12 can be L-shaped so that it can be welded to the rear panel 6 if the support rod and at least the rear wall panel 6 are made of a metal. Alternatively, the distal end 12 of the rod 10 may be secured in a slot (not shown) in the rear panel 6. The rod 10 extends forwardly from the rear panel 6 and terminates at a free end 14 which is located near the front panel 4. In some implementations, the free end 14 of the rod 10 is angled upwardly so as to retard merchandise from falling off the rod 10 until it is pushed off the free end 14 of the rod 10 by the rotation of the coil 40. An actuator 100 is rotatably mounted to the front panel 4. The actuator 100 is connected to a proximal end of the coil 40 so that rotation of a portion of the actuator 100 rotates the coil 40 about the common axis 5, as discussed in greater detail below. The actuator 100 may include an outer knob section 110, an inner knob section or actuator part 130 (FIG. 2), a housing 160, and a time delay mechanism 280 (FIG. 2).

Figure 2:
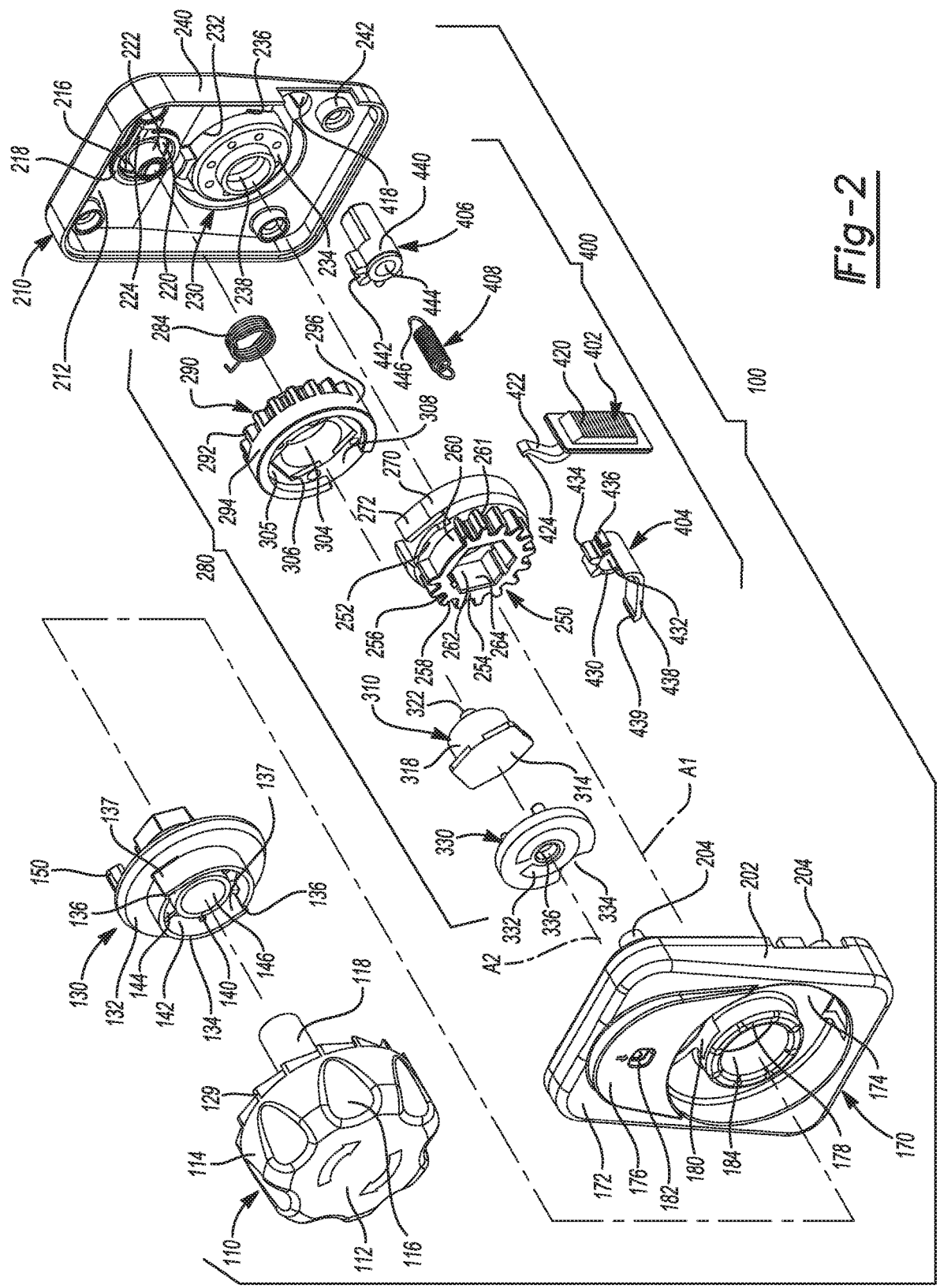
FIG. 2 is an exploded front perspective view of the time delay actuator of FIG. 1.
Figure 3:
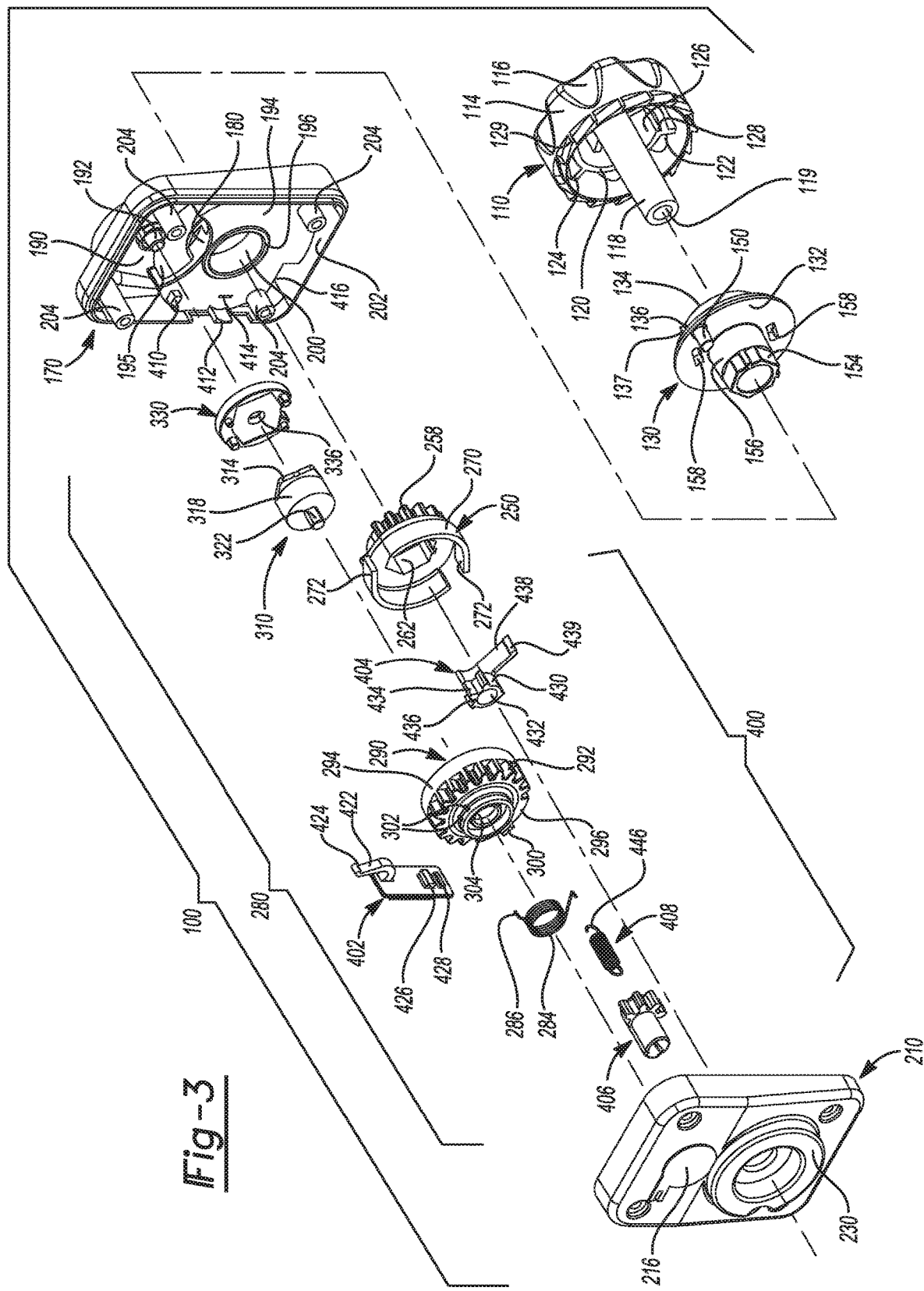
FIG. 3 is an exploded rear perspective view of the actuator of FIG. 1.

As illustrated in FIG. 2, the outer knob section 110 may comprise a front wall 112 and a skirt 114 depending therefrom. In some implementations, a set of spaced grooves 116 are defined in at least the skirt 114 so as to enable an easier grasping and rotation of the knob by a shopper. With reference now also to FIG. 3, a hollow cylindrical member or shaft 118 extends in a rearwardly oriented direction centrally from a rear face of the front wall 112. An axial hole 119 is defined in the hollow cylindrical shaft 118. In this way, a free end of a product dispensing coil (such as coil 40 shown in FIG. 1) can be fixedly and non-rotatably attached to the outer knob section 110. A generally circular flange or protrusion 120 extends rearwardly from the rear face of the front wall 112. It is noted that a pair of notches 128 are defined in the inner wall of the generally circular flange at two generally opposite locations. In those locations, the inner surface of the flange is not circular and those portions of the inner surface extend tangentially from the remainder of the generally circular inner surface of the flange, thus creating a pair of ratcheting notches 128. The flange 120 is located radially inwardly of the skirt 114 so as to define an annular space 122. Located in the annular space are a series of spaced reinforcing elements or ribs 124. The flange 120 is located radially outwardly of the shaft 118 so as to define a second annular space 126. The outer knob section 110 includes a plurality of teeth 129 defined in the skirt 114 or disposed adjacent to the skirt 114. For example, the teeth 129 may be disposed on an outer peripheral surface of the skirt 114. The teeth 129 may be angled or slanted to selectively permit rotation of the outer knob section 110 in the clockwise direction (from the perspective shown in FIG. 2) and to selectively inhibit rotation of the outer knob section 110 in the counter-clockwise direction (from the perspective shown in FIG. 2), as will be described in more detail below.

The inner knob section or actuator part 130 may be mounted on the shaft 118. With reference again to FIG. 2, the inner part 130 comprises a base wall 132. An outer generally circular flange or protrusion 134 extends forwardly from the base wall 132. It is noted that a pair of openings 136 are defined in the flange 134 at one location. In those locations, a pair of ratcheting flanges 137 extend tangentially outwardly from the remainder of the flange and are not connected to the base wall 132. Thus, the flanges 137 are relatively flexible in relation to the remainder of the inner knob section 130. Also extending forwardly from the base wall 132 is an inner circular flange 140. Thus, an annular space 142 is defined between the outer generally circular flange 134 and the inner circular flange 140. A plurality of spaced ribs or reinforcing elements 144 are located in the annular space 142.

Extending through the base wall 132 and located inwardly of the inner circular flange is a central opening 146 which can best be seen in FIG. 2. The shaft 118 extends into the central opening 146 as may be best seen in FIG. 5. The generally circular flange 134 of the inner knob section 130 extends into the second annular space 126 of the outer knob 110, with the outer surface of the generally circular flange 134 engaging the inner surface of the generally circular flange 120. When the outer knob 110 is rotated in one direction relative to the inner knob 130, the disconnected tangential portions of the flanges 137 engage with the notches 128 of the outer knob causing the outer and inner knob sections 110, 130 to rotate together as if they were a single component. When the outer knob 110 is rotated relative to the inner knob 130 in the opposite direction, the disconnected tangential portions of the flanges 137 flex and do not engage notches 128 causing the outer knob to rotate independently of the inner knob.

With reference now to FIG. 3, extending rearwardly from the rear face of the base wall 132 is a protrusion 150 that is located near an outer periphery of the base wall 132. Extending rearwardly from the rear face of the base wall 132 is a centrally located tube section 154 which has a generally hexagonal outer periphery. The tube section 154 is mounted on a rounded tubular section 156 supported centrally on the rear face of the base wall 132. Defined in the base wall are a pair of slots 158 which are aligned with the flange portions 137 of the outer generally circular flange 134 causing the flange portions 137 to be disconnected from the base wall 132.

With reference again to FIG. 2, the housing 160, on which the knob assembly (e.g., the outer knob section 110 and/or the inner knob section 130) is mounted may comprise a housing front half 170 and a housing rear half 210. The housing front half 170 may include a base wall 172. Defined in the base wall 172 may be an annular recessed area 174 and extending from the base wall 172 may be a raised area 176. Extending radially inwardly from the recessed annular area 174 may be an annular plateau 178. Defined near an upper end of the raised area 176 may be a window opening 182. Located in the annular recessed area 174 may be a cut out or slot 180. A central opening 184 may extend through the front wall 172 and may be circumscribed by the annular plateau 178. It should be apparent from FIG. 5 that the shaft 118 and tube section 154 extend through the central opening 184.

With reference now again to FIG. 3, the housing front half 170 may further include a recessed housing area 190. Extending axially rearwardly from a rear surface of the base wall 172 may be a pin 192. The pin 192 may be centrally positioned in the recessed housing area 190. Further defined on the rear side of the housing front half 170 may be a generally toroidal raised area 194. The raised area 194 may include an upper cutout section 195. The upper cutout section 195 may be located in the area of, or otherwise aligned with, the slot 180 in the base wall 172. Thus, while the recessed housing area 190 is completely circular, the upper cutout section 195 of the generally toroidal raised area 194 may define in part the circular shape of the recessed housing area 190, or otherwise allow the recessed housing area 190 to be circular. The raised area 194 may include a catch 410 and a guard 412 each extending from a surface of the raised area 194 and a slot 414 defined in the raised area 194. The raised area 194 may include a lower cutout section 416 defined in a periphery of the raised area 194. It should also be apparent that the window or opening 182 may be located in the recessed housing area 190 of the base wall 172.

Figure 5:
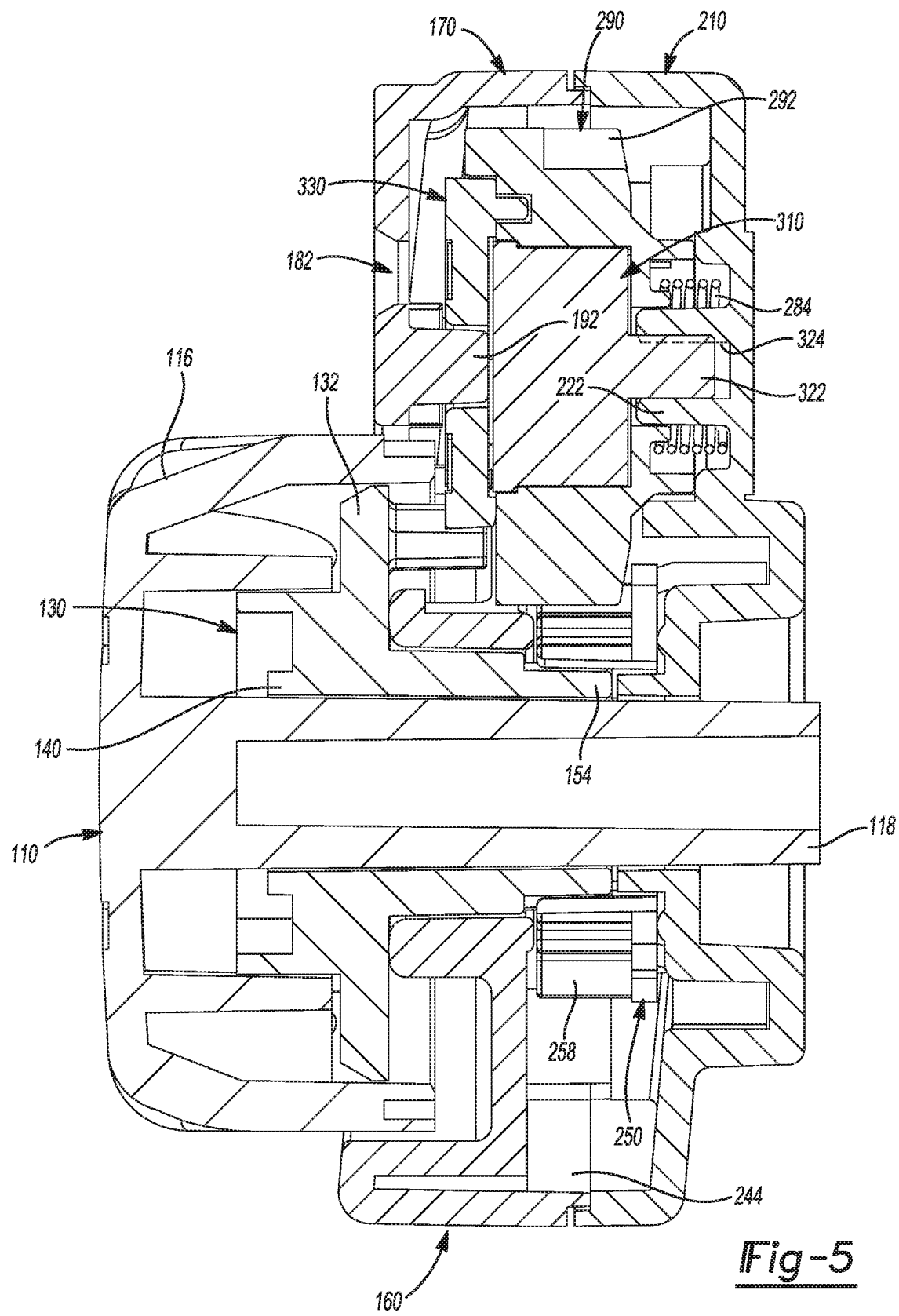
FIG. 5 is an enlarged assembled side elevational view in cross section of the actuator of FIG. 1.

Located radially inwardly of the raised area 194 is an annular recessed area 196. A ring-shaped or toroidal flange 200 may extend rearwardly from the base wall 172 such that the annular recessed area 196 is defined between the ring-shaped flange 200 and the raised area 194. Extending rearwardly from the base wall 172 may be a skirt 202. A series of bosses 204 may also extend rearwardly from the front wall 172. The bosses 204 may be located adjacent the skirt 202. In some implementations, four such bosses 204 are illustrated. FIG. 5 illustrates that the actuator knob inner part 130 mates with the contoured wall section 178 of the housing front half 170 so that the base 156 and hexagonal tube section 154 of the actuator knob inner part 130 extend through the central opening 184 of the housing front half 170.

With reference now again to FIG. 2, cooperating with the housing front half 170 is the housing rear half 210. The housing rear half 210 may comprise a base wall 212 on which is defined an upper recessed area 216 circumscribed by a generally circular rib 218, thus defining an annular space 220. A central protrusion 222 may extend forwardly from the wall 212. An opening or slot 224 may be defined at one location in the rib 218.

Also defined in the rear wall 212 is a lower recessed area 230 including an annular section 232 and a raised ring-shaped central plateau 234. A ratchet surface 236 is defined on an outer wall of the recessed area 230. In some implementations, several such ratchet surfaces 236, for example, four, can be defined on the outer face of the wall defining the annular section 232. Extending through the rear wall 212 is a central opening 238. It should be appreciated from FIG. 2 that the central opening 238 may be aligned with the central opening 184 located in the housing front half 170. Defined in the rear wall 212 may be a recess 418 adjacent to the lower recessed area 230. For example, the recess 418 may open into, or otherwise be in fluid communication with, the lower recessed area 230. The housing rear half 210 may also include a skirt 240 and a set of sockets 242. It should be appreciated that the sockets 242 are designed to mate with the bosses 204 extending from the housing front half 170. Thus, the housing halves 170, 210 can be secured to each other in any known manner, such as via the use of fasteners or adhesives, as is known in the art.

The time delay mechanism 280 may be supported within a cavity 244 (FIG. 5) defined by the housing front and rear halves 170 and 210 and may include a first gear 250 (e.g., a central gear), a second gear 290, a load spring 284, a rotary damper 310, and a signaling wheel 330. The first gear 250 may include a base wall 252 extending forwardly from which is a ring section 254. Defined on an outer surface 256 of the ring section 254 may be a plurality of aligned teeth 258. The first gear 250 may also include a relatively large curved section 260 located between a pair of the teeth 258. Importantly, the curved section 260 has no teeth. A diameter of the curved section 260 may equal a diameter of a root 261 of the teeth 258, e.g., the outer surface 256 of the ring section 254. An inner surface 262 of the ring 254 may include a plurality of spaced flat sections 264 so as to define a hexagonally shaped inner periphery for the ring. The hexagonally shaped outer surface of the tube section 154 may be sized and shaped to mate with the hexagonally shaped inner surface 262 of the ring 254. Thus, the first gear 250 may be fixedly engaged with the actuator knob inner part 130 so that rotation of the actuator knob inner part 130 will cause a rotation of the first gear 250 about an axis A1.

With reference now again to FIG. 3, a skirt 270 may depend from the base wall 252. Defined in the skirt 270 may be one or more ratchet members or protrusions 272. In some implementations, the skirt 270 may define one planar protrusion 272. The ratchet member 272 of the first gear 250 may be adapted to cooperate with the ratchet surface 236 defined on the housing rear half 210.

As is evident from FIG. 2, the load spring 284 may be disposed in the annular space 220 defined in the housing rear half 210 such that a distal end of the spring extends through the opening 224 in the circular rib section 218. A front end or proximal end 286 of the spring may cooperate with, or otherwise engage, the second gear 290.

The second gear 290 may include a plurality of spaced gear teeth 292 extending axially from a rim 294. Defined in one radial section of the second gear 290 is a curved surface 296 where no teeth are present. Thus, only a portion of the rim contains the gear teeth 292.

With reference again to FIG. 3, depending from a rear surface of the second gear 290 is a protrusion 300. Defined in the rear surface are a pair of openings 302 which are spaced from the protrusion 300. It should be appreciated that the spring proximal end 286 is meant to be accommodated in one of the openings 302 defined in the second gear 290. Also defined in the second gear is a central opening 304.

With reference again to FIG. 2, the rim 294 may extend around, or otherwise define, a recess 305 within the second gear 290. There is provided radially within the rim 294 and the recess 305 a recessed hexagonally shaped area 306. The rim 294 may further define an opening 308 connected to the recess 305. Connected to the second gear is the rotary damper 310. The rotary damper includes a hexagonal base wall 314 which is meant to be engaged by the recessed hexagonal area 306 in the second gear. A circular raised area or protrusion 318 of the rotary damper 310 is accommodated in the second gear central opening 304. Depending from the raised circular area 318 is a stem 322. With reference again to FIG. 5, it can be seen that the stem 322 of the rotary damper 310 is accommodated in a bore 324 of the central protrusion 222 located on the housing rear half 210. Thus, the rotary damper and, hence, the second gear 290 in which the rotary damper 310 is accommodated are coupled to each other and rotate about the stem 322 which is rotationally mounted on the rear housing half 210. In an alternate implementation, it should be appreciated that the rotary damper 310, the housing rear half 210, the second gear 290, and/or the signaling wheel 330 could be formed as one single component from a suitable plastic such as by molding.

The time delay mechanism 280 also comprises the signaling wheel 330 that is non-rotatably attached to the second gear 290. The wheel includes a front face having a semi-circular recessed area 334. Also provided is a central bore 336 that is spaced from the recessed area 334. The central bore 336 cooperates with the pin 192 depending from the housing front half 170 such that the signaling wheel 330 and the second gear 290 are rotatably mounted on the front housing half 170 via the pin 192 and the stem 322 for rotation about an axis A2. The signaling wheel 330 may be disposed within the recess 305 of the second gear 290 such that the recessed area 334 is aligned with the opening 308.

In some implementations, the front face of the signaling wheel 330 has a color portion 332 including a first color, such as red in a first section, as well as a second color, such as green in a second section. The second color green is located such that it is only visible through the window 182 when the second gear 290 has returned to its home position. In this way, a shopper can see through window 182 whether the actuator mechanism is able to rotate the coil to which it is attached, via the coil being attached to the opening in the shaft 118, such as when the color green is shown through the window 182, or is prevented from rotating the coil, such as when the color red is shown by the signaling wheel. It should be appreciated that protrusion 150 of the knob inner part engages in and cooperates with recessed area 334 of the signaling wheel 330, and the opening 308 of the second gear 290, through the slot 180 defined in the front housing half 170.

In some implementations, it can be appreciated that the outer knob 110 is able to turn in two opposing directions: clockwise and counterclockwise. When a product dispensing coil is fixedly and non-rotatably attached to the outer knob 110, a full clockwise rotation of the outer knob will dispense a single product. A full counter-clockwise rotation or the outer knob 110 will allow product to be loaded onto the peg hook. When turned in the product dispensing direction (clockwise), the outer knob 110 is operationally engaged with the inner knob 130 by way of the ratcheting notch 128 and ratcheting flange 137. When turned in the opposite direction (counter-clockwise), the outer knob 110 is free to rotate independently of the inner knob 130, thus bypassing the time delay mechanism 280.

Figure 4:
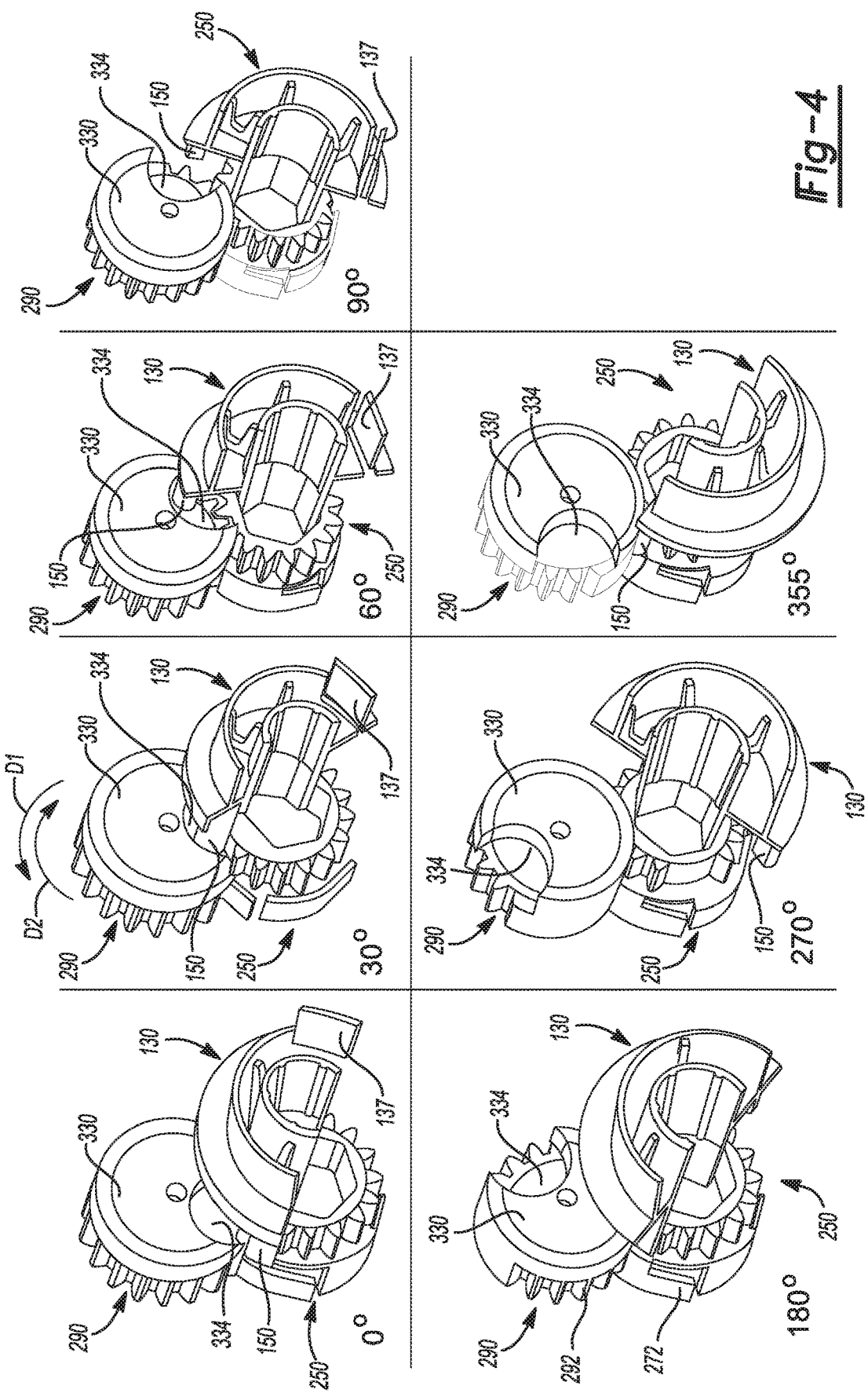
FIG. 4 is a series of perspective views of a set of gears in the actuator of FIG. 1 with the gears in the actuator being shown at angles of 0 degrees, 30 degrees, 60 degrees, 90 degrees, 180 degrees, 270 degrees and 355 degrees of rotation.

Further describing the function of the merchandise dispenser 1 in this implementation, when the outer knob 110 is turned in the dispensing direction (clockwise) about the axis A1, the inner knob 130 is operationally engaged by the outer knob 110 and the first gear 250 is turned by means of the hex drive interface 154, 264. Shortly after rotation of the first gear about the axis A1, the protrusion 150 of the inner knob enters the semi-circular recessed area 334 of the time delay mechanism 280 and the first tooth of the first gear 250 engages the first tooth of the second gear 290 causing the second gear 290 to rotate about the axis A2. This is shown in the 0 degree and 30 degree illustrations of FIG. 4. It should be noted that there is a single unique position that allows entry of the protrusion 150 into the semi-circular recessed area 334 and into the opening 308 of the second gear 290; all other positions of the time delay mechanism prevent entry of the protrusion 150. As the engaged teeth of the first gear, rotating in the clockwise direction, cause a counter-clockwise rotation in the second gear 290, the protrusion 150 continues passing through the semi-circular recessed area 334. This is shown in illustrations 60 degree and 90 degree of FIG. 4. As rotation of the first gear continues, counter-rotation of the second gear continues and potential energy is stored in the torsion spring 284. This is shown in illustrations 180 degree and 270 degree of FIG. 4. When an approximately 355 degree clockwise rotation of the first gear has occurred, further rotation is prevented by the protrusion 150 being blocked from entry into the semi-circular recessed area 334. Additionally, further rotation of the second gear is prevented by protrusion 300 coming into contact with the rear housing half 210. See illustration 355 degree of FIG. 4. At this same time, namely at approximately 355 degrees of first gear rotation, the lack of teeth on the first gear (e.g., section 260) and/or the lack of teeth on the second gear (e.g., curved surface 296) cause the second gear to become rotationally disengaged from the first gear and the stored energy of the torsion spring biases the second gear back to its original position. The rotary damper controls the rate at which the second gear returns to its original position, thus causing a time delay during which the outer knob remains unable to rotate in a clockwise, dispensing direction. It is only after the second gear has returned to its original position that the outer knob can once again be turned to dispense another product.

Referring to FIGS. 2, 3, 6, and 7, the actuator 100 may include a locking mechanism or subassembly 400. To add product to the merchandise dispenser 1 (e.g., to the support rod 10), an employee or any other suitable person may rotate the outer knob section 110 in a counterclockwise direction (from the perspective shown in FIG. 1) until the product reaches the distal end 12 of the rod 10 or is located between each of the spiraling coil sections 46 of the helical coil 40. To remove product, a customer or any other suitable person may rotate the outer knob section 110 in a clockwise direction (from the perspective shown in FIG. 1) until the product reaches the free end 14 of the support rod 10. The locking subassembly 400 may be implemented to selectively prevent the actuator 100 from rotating in a counterclockwise direction such that customers are prohibited from delivering products toward the distal end 12 of the rod 10. Additionally, in situations where an employee mistakenly leaves the locking assembly 400 in an unlocked position (FIG. 6), the locking assembly 400 may include functionality to move to a locked position (FIG. 7) in response to a customer retrieving product (e.g., in response to a customer rotating the outer knob section 110 in the clockwise direction (from the perspective shown in FIG. 1), as will be described in more detail below.

The locking subassembly 400 includes a button 402, a locking gear 404, a biasing gear 406, and a biasing element 408 (e.g., a torsion spring). In the assembled configuration (FIG. 6), the button 402 may be translatably disposed between the skirt 202 of the front half 170 of the housing 160 and the skirt 240 of the rear half 210 of the housing 160. The button 402 may include a gripping surface 420 on an outer surface to facilitate engagement of the button 402 by a user. In some implementations, the gripping surface 420 is a plurality of grooves or notches. The button 402 includes an arm 422 on an inner surface, the arm 422 including a distal lip 424 configured to selectively engage the catch 410 of the front housing half 170, such that the catch 410 retains the button 402, as will be described in more detail below. The button 402 includes an upper protrusion 426 and a lower protrusion 428 each opposite the arm 422 on the inner surface of the sliding button 402. In particular, the upper protrusion 426 may be disposed between the lower protrusion 428 and the arm 422.

The locking gear 404 includes a main body 430 having a bore 432 configured to rotatably receive one of the bosses 204 of the front housing half 170. The main body 430 includes one or more teeth 434 and a projection 436 on an outer surface of the main body 430. In particular, the one or more teeth 434 and the projection 436 may extend radially from the outer surface of the main body 430. The main body 430 may also include a locking arm 438 extending tangentially from the outer surface of the main body 430 and having a distal end 439.

The biasing gear 406 includes a main body 440 rotatably disposed within the recess 418 of the lower housing half 210. The main body 440 includes a series of teeth 442 configured to engage the teeth 258 of the first gear 250 and the teeth 434 of the locking gear 404. The main body 440 includes a bore 444 configured to receive the biasing element 408. The biasing element 408 includes a proximal end 446 configured to engage the slot 414 in the front housing half 170, such engagement operable to bias the biasing element 408 toward the locked position.

Figure 6:
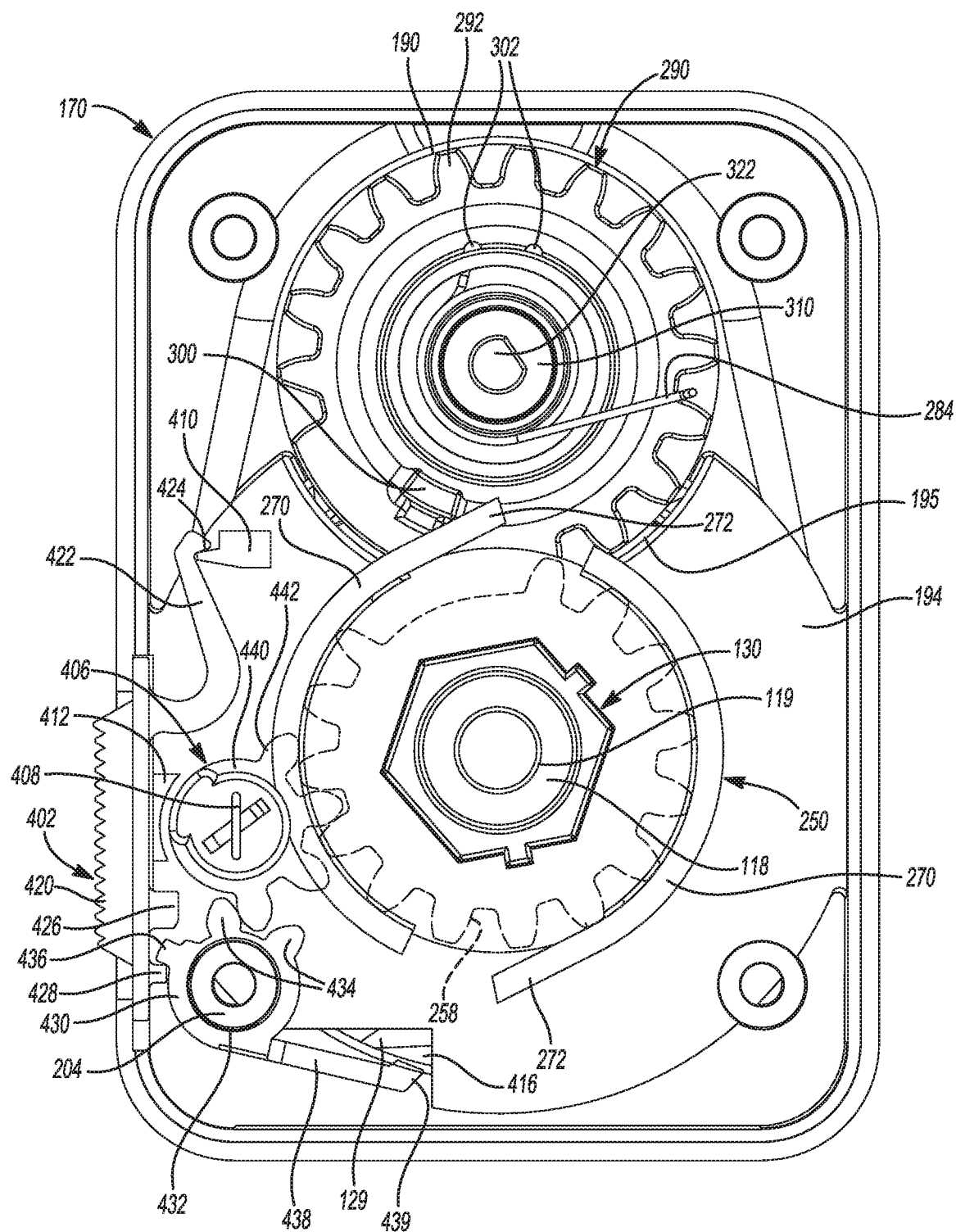
FIG. 6 is an assembled front plan view of the actuator of FIG. 1 in a first position with certain components removed or shown in hidden lines for clarity.
Figure 7:
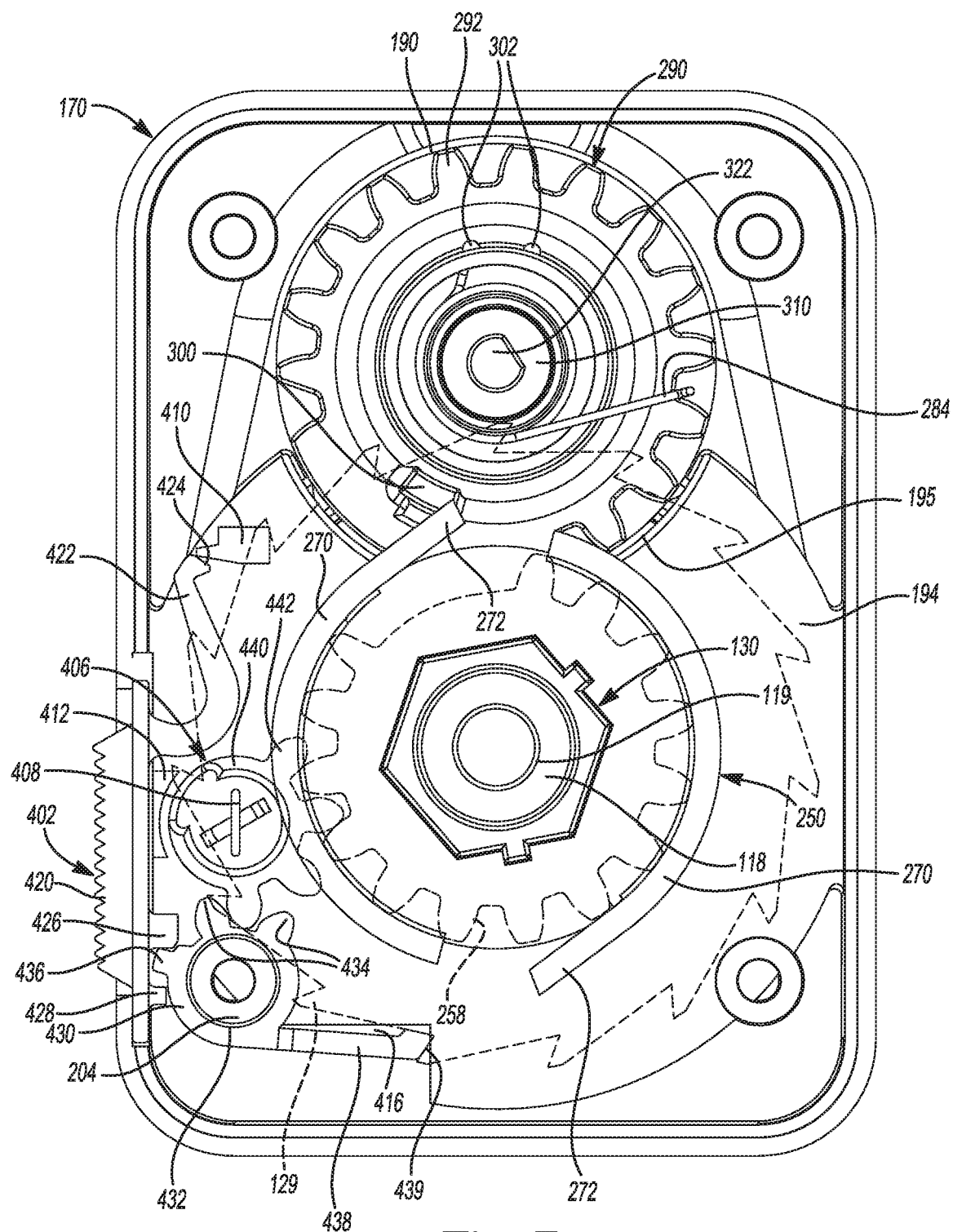
FIG. 7 is an assembled front plan view of the actuator of FIG. 1 in a second position with certain components removed or shown in hidden lines for clarity.

With reference to FIGS. 6 and 7, operation of the locking subassembly 400 will now be described. Referring to FIG. 6, the locking subassembly 400 is in the unlocked position, in which an employee is permitted to rotate the outer knob section 110 clockwise (counterclockwise in the perspective shown in FIG. 1) to add product. To move to the unlocked position (FIG. 7), in which a customer is prohibited from rotating the outer knob section 110 clockwise (counterclockwise in the perspective shown in FIG. 1), an employee may translate (e.g., slide) the button 402 relative to the housing 160 until the distal lip 424 disengages from the catch 410. With the distal lip 424 disengaged from the catch 410, the biasing element 408 biases the biasing gear 406 toward the locked position by rotating the biasing gear 406. The teeth 442 of the biasing gear 406 may apply a force upon the teeth 434 of the locking gear 404, causing the locking gear 404 to rotate until the distal end 439 of the locking arm 438 engages one of the teeth 129 of the outer knob section 110, thus, inhibiting clockwise rotation of the outer knob section 110. As another example, the employee may move the button 402 until the upper protrusion 426 engages the projection 436 of the locking gear 404, thus, causing the locking gear 404 to rotate until the distal end 439 of the locking arm 438 engages one of the teeth 129 of the outer knob section 110, thus, inhibiting clockwise rotation of the outer knob section 110.

In some implementations, an employee may mistakenly forget to move the button 402 to the locked position illustrated in FIG. 7. When a customer properly uses the actuator 100 to retrieve product, i.e., rotating the outer knob section counterclockwise (clockwise in the perspective shown in FIG. 1), the teeth 258 of the first gear 250 apply a force upon the teeth 442 of the biasing gear 406, causing the biasing gear 406 to rotate in the clockwise direction relative to the view in FIG. 6. As the biasing gear 406 rotates, the teeth 442 of the biasing gear 406 apply a force upon the teeth 434 of the locking gear 404, causing the locking gear 404 to rotate in the counter-clockwise direction, relative to the view in FIG. 6, such that the projection 436 pushes against the lower protrusion 428 until the distal lip 424 of the arm 422 of the button 402 disengages with the catch 410. With the distal lip 424 of the arm 422 of the button 402 disengaged from the catch 410, the biasing element 408 may rotate the biasing gear 406 in the clockwise direction relative to the view in FIG. 6 toward the locked position. The teeth 442 of the biasing gear 406 apply a force against the teeth 434 of the locking gear 404, causing the locking gear 404 to rotate in the counter-clockwise direction relative to the view in FIG. 6 until the distal end 439 of the locking arm 438 engages one of the teeth 129 of the outer knob section 110, thus, inhibiting clockwise rotation of the outer knob section 110.

In some implementations, the housing halves 170 and 210, as well as the components held therein, other than the spring 284, can be made of a suitable conventional plastic material. So, too, can the outer and inner knob sections 110 and 130. Of course, other known materials could be employed instead, if so desired.

In the time delay mechanism disclosed herein, two gears interface with each other, but the lack of teeth on the first and second gears means there is some slippage between the first and second gears so that a movement of the consumer accessible actuator knob 110 does not necessarily cause a movement of the coil which extends around the support rod on which merchandise is hung.

While the time delay actuator has been described in connection with a rotating knob, it should be appreciated that the same type of time delay mechanism can be provided for a linear actuator, such as a lever or the like.

The disclosure has been described with reference to one particular embodiment. Obviously, modifications and alterations will occur to others upon the reading and understanding of this specification. It is intended to include all such modifications and alterations insofar as they come within the scope of the appended claims or the equivalents thereof.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

What is claimed is:

1. A product-dispensing device comprising:
a rod configured to support a product;
a product-dispensing coil disposed about the rod;
an actuator operably coupled to the product-dispensing coil for rotation about a first axis, the actuator including an outer knob rotatable in a first direction about the first axis and a second direction opposite the first direction about the first axis, wherein when the outer knob is rotated in the first direction the product-dispensing coil is configured to rotate and cause the product to move closer to a free end of the rod, the outer knob including a plurality of teeth on an outer peripheral surface;
a locking gear rotatable between a first position and a second position and including a locking arm configured to selectively engage the plurality of teeth of the outer knob in the second position to inhibit rotation of the outer knob in the second direction about the first axis; and
a button operably coupled to the locking gear and configured to rotate the locking gear between the first position and the second position.

2. The device of claim 1, further comprising a biasing gear coupled to the locking gear and configured to bias the locking gear toward the second position.

3. The device of claim 2, further comprising a biasing spring coupled to the biasing gear, and wherein the biasing gear is rotatable between the first position where the locking gear is in the first position and the second position where the locking gear is in the second position, the biasing spring configured to bias the biasing gear toward the second position.

4. The device of claim 3, further comprising a central gear operably coupled to the outer knob and configured to rotate with the outer knob in the first direction about the first axis, the central gear configured to rotate the biasing gear between the first position and the second position.

5. The device of claim 4, wherein when the locking gear is in the first position and the biasing gear is in the first position, upon rotation of the central gear in the first direction about the first axis, the central gear causes the biasing gear to rotate from the first position to the second position.

6. A product-dispensing device comprising:
a housing;
an actuator supported by the housing for rotation about a first axis, the actuator including an outer knob rotatable in a first direction about the first axis to dispense a first product and in a second direction opposite the first direction about the first axis, the outer knob including a plurality of teeth on an outer peripheral surface;
a locking gear supported by the housing for rotation between a first position and a second position about a second axis, the locking gear including a locking arm configured to selectively engage the plurality of teeth of the outer knob to inhibit rotation of the outer knob in the second direction about the first axis when the locking arm is in the second position; and
a button supported by the housing for translation between the first position and the second position, the button operable to rotate the locking gear between the first position and the second position upon translation between the first position and the second position.

7. The device of claim 6, further comprising a biasing gear coupled to the locking gear and configured to bias the locking gear toward the second position.

8. The device of claim 7, further comprising a biasing spring coupled to the biasing gear, and wherein the biasing gear is rotatable between a first position where the locking gear is in the first position and the second position where the locking gear is in the second position, the biasing spring configured to bias the biasing gear toward the second position.

9. The device of claim 8, further comprising a central gear operably coupled to the outer knob and configured to rotate with the outer knob in the first direction about the first axis, the central gear configured to rotate the biasing gear between the first position and the second position.

10. The device of claim 9, wherein when the locking gear is in the first position and the biasing gear is in the first position, upon rotation of the central gear in the first direction about the first axis, the central gear causes the biasing gear to rotate from the first position to the second position.

11. The device of claim 6, wherein the housing includes a catch configured to retain the button in the first position.

12. A locking mechanism for a product-dispensing device, the locking mechanism comprising:
a locking gear rotatable between a first position and a second position and including a locking arm configured to inhibit rotation of an actuator in the second position;
a button configured to translate between the first position and the second position, the button operable to rotate the locking gear between the first position and the second position upon translation between the first position and the second position;
a biasing gear coupled to the locking gear and configured to bias the locking gear toward the second position; and
a biasing spring coupled to the biasing gear, and wherein the biasing gear is rotatable between the first position where the locking gear is in the first position and the second position where the locking gear is in the second position, the biasing spring configured to bias the biasing gear toward the first position.

13. The mechanism of claim 12, wherein translation of the button from the first position to the second position causes the biasing gear to rotate from the first position to the second position.

14. The mechanism of claim 12, further comprising a catch configured to retain the button in the first position.

15. The mechanism of claim 14, wherein rotation of the biasing gear from the first position to the second position causes (i) the locking gear to rotate from the first position to the second position, (ii) the button to disengage from the catch, and (iii) the button to translate from the first position to the second position.

* * * * *